US012710826B2

(12) United States Patent
Morsy et al.

(10) Patent No.: US 12,710,826 B2
(45) Date of Patent: Aug. 18, 2026

(54) ARTIFICIAL REALITY BASED SYSTEM, METHOD, AND COMPUTER PROGRAM FOR MODIFYING AUDIO DATA BASED ON GESTURE DETECTION

(71) Applicant: ALGORIDDIM GMBH, Munich (DE)

(72) Inventors: Kariem Morsy, Munich (DE); Federico Tessmann, Munich (DE)

(73) Assignee: ALGORIDDIM GMBH, Munich (DE)

( * ) Notice: Subject to any disclaimer, the term of this patent is extended or adjusted under 35 U.S.C. 154(b) by 129 days.

(21) Appl. No.: 18/394,694

(22) Filed: Dec. 22, 2023

(65) Prior Publication Data

US 2024/0402822 A1 Dec. 5, 2024

Related U.S. Application Data

(60) Provisional application No. 63/505,834, filed on Jun. 2, 2023.

(51) Int. Cl.
*G06F 3/01* (2006.01)
*G06F 3/16* (2006.01)
*G06V 40/20* (2022.01)

(52) U.S. Cl.
CPC .............. *G06F 3/017* (2013.01); *G06F 3/011* (2013.01); *G06F 3/165* (2013.01); *G06V 40/28* (2022.01)

(58) Field of Classification Search
CPC .......... G06F 3/017; G06F 3/011; G06F 3/165; G06V 40/28
See application file for complete search history.

(56) References Cited

U.S. PATENT DOCUMENTS

| | | | |
|---|---|---|---|
| 6,541,690 | B1 | 4/2003 | Segers, Jr. |
| 7,592,534 | B2 | 9/2009 | Yoshikawa et al. |
| 8,369,974 | B2 | 2/2013 | Daisy |
| 8,636,199 | B1 | 1/2014 | Slayden et al. |
| 9,208,765 | B1 | 12/2015 | Sivertsen |
| 9,583,140 | B1 | 2/2017 | Rady |
| 10,284,695 | B1 | 5/2019 | Geji et al. |
| 2004/0089141 | A1 | 5/2004 | Georges et al. |
| 2006/0034043 | A1 | 2/2006 | Hisano et al. |

(Continued)

FOREIGN PATENT DOCUMENTS

EP 4068052 A1 10/2022

OTHER PUBLICATIONS

U.S. Appl. No. 18/394,763, Non-Final Office Action mailed Aug. 5, 2025, 12 pages.

(Continued)

*Primary Examiner* — Justin R. Blaufeld
(74) *Attorney, Agent, or Firm* — Kilpatrick Townsend & Stockton LLP

(57) ABSTRACT

The present invention provides a system for processing audio data, comprising an audio input unit for receiving input data, the input data being audio data representing a piece of music, an audio processing unit for processing the input data to obtain output data, an audio output unit for playing the output data, and a gesture detecting unit for detecting a gesture of a hand of a user, wherein the audio processing unit is connected to the gesture detecting unit and the audio output unit such as to modify processing of the input data depending on the gesture detected by the gesture detecting unit, while continuing playback of the output data.

18 Claims, 4 Drawing Sheets

(56) References Cited

U.S. PATENT DOCUMENTS

Figure 1:
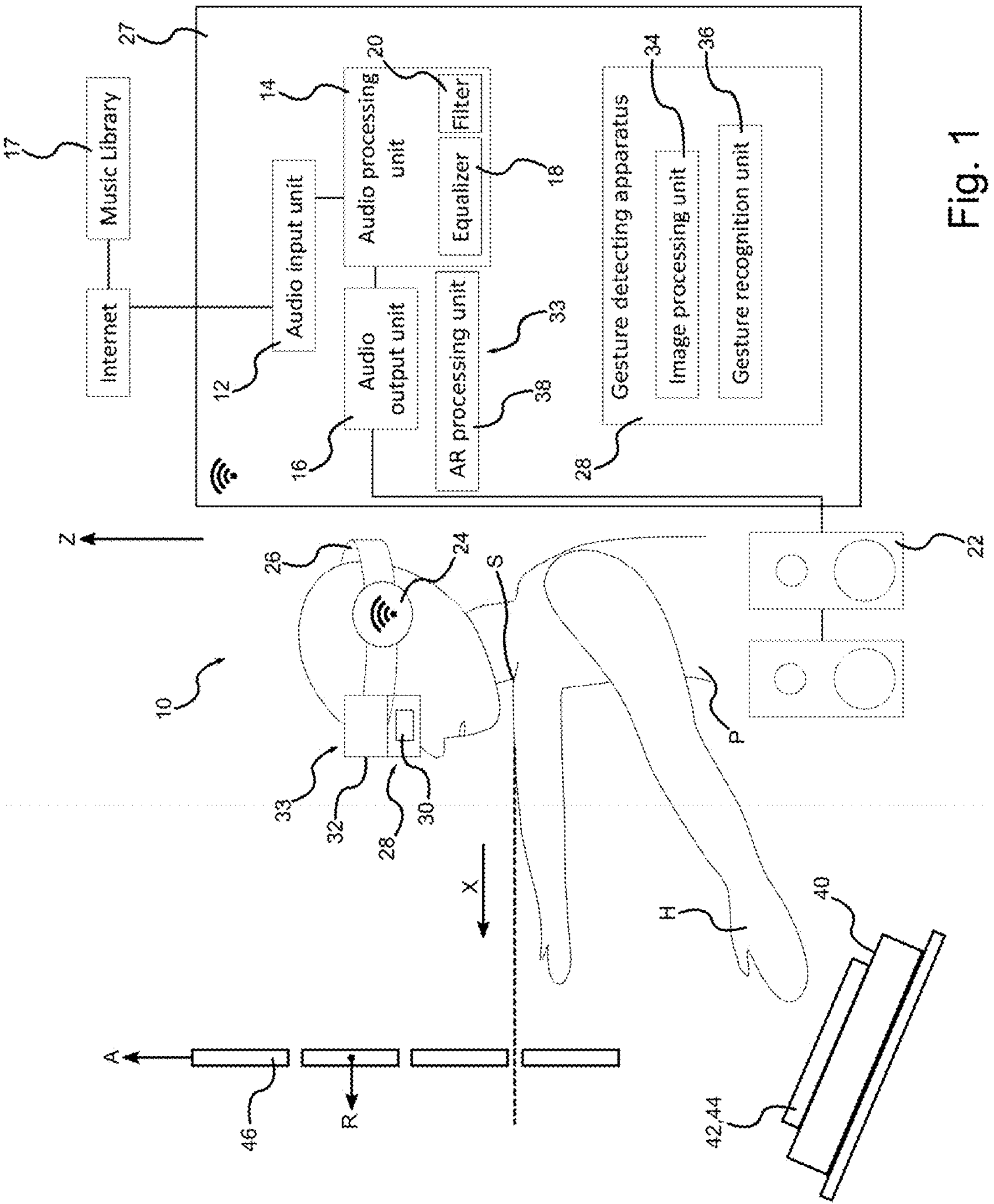

2007/0079241 A1 4/2007 Wang et al.
2008/0205681 A1 8/2008 Norberg et al.
2009/0109795 A1 4/2009 Marti
2009/0286601 A1 11/2009 Rubio et al.
2010/0013613 A1 1/2010 Weston
2010/0151946 A1 6/2010 Wilson et al.
2010/0318204 A1 12/2010 Daisy
2012/0059494 A1 3/2012 David
2012/0130516 A1 5/2012 Reinsch et al.
2012/0310392 A1 12/2012 Abuelsaad et al.
2013/0131850 A1 5/2013 Carrier
2013/0154930 A1 6/2013 Xiang et al.
2013/0259238 A1 10/2013 Xiang et al.
2013/0305152 A1* 11/2013 Griffiths .................. H04S 7/307 715/716
2013/0345842 A1 12/2013 Karakaya et al.
2014/0002376 A1 1/2014 Oliver et al.
2014/0173440 A1 6/2014 Dal Mutto et al.
2014/0214189 A1 7/2014 Goodwin
2014/0267002 A1 9/2014 Luna
2014/0316543 A1 10/2014 Sharma et al.
2014/0358263 A1 12/2014 Irmler et al.
2015/0148927 A1 5/2015 Georges et al.
2015/0220178 A1 8/2015 Zeliff et al.
2015/0268921 A1 9/2015 Georges
2015/0286360 A1 10/2015 Wachter
2015/0331659 A1 11/2015 Park
2015/0355879 A1 12/2015 Beckhardt et al.
2015/0371529 A1 12/2015 Dolecki
2016/0116988 A1 4/2016 Priyantha et al.
2017/0075426 A1* 3/2017 Camacho Perez ...... G06F 1/163
2017/0083103 A1* 3/2017 Chen ...................... H04N 23/63
2017/0123487 A1* 5/2017 Hazra ................... G06F 3/0482
2017/0269771 A1* 9/2017 Nam ................... G06F 3/04886
2017/0329409 A9 11/2017 Chun et al.
2018/0074639 A1* 3/2018 Powell .................... G06F 3/044
2018/0088672 A1 3/2018 Schantz et al.
2018/0182387 A1 6/2018 Chua et al.
2018/0192226 A1 7/2018 Woelfl et al.
2018/0217680 A1* 8/2018 Sudou ..................... G06F 3/017
2018/0218561 A1* 8/2018 Oldroyd .................. G07F 9/001
2018/0270576 A1 9/2018 Chua et al.
2018/0277160 A1 9/2018 Soda et al.
2019/0163287 A1* 5/2019 MacWilliams ..... G06F 3/04847
2019/0232500 A1 8/2019 Bennett et al.
2019/0236842 A1 8/2019 Bennett et al.
2020/0233572 A1* 7/2020 Healy ................... G06F 3/0416
2020/0294313 A1 9/2020 Arroyo Palacios et al.
2021/0004146 A1* 1/2021 Linville ................ G06F 3/0304
2021/0096726 A1* 4/2021 Faulkner ................. G06F 3/011
2021/0191526 A1 6/2021 Heo et al.
2021/0319624 A1* 10/2021 Kawabe .................. G06T 19/20
2022/0083197 A1* 3/2022 Rockel .................. G06T 19/006
2022/0091722 A1* 3/2022 Faulkner ................. G06F 3/013
2022/0199056 A1 6/2022 Morsy
2023/0169498 A1 6/2023 Sado
2023/0274512 A1 8/2023 Terre et al.
2023/0343043 A1* 10/2023 Greunke ............... G06T 7/0002
2023/0343314 A1 10/2023 Morsy et al.
2023/0419931 A1 12/2023 Takei et al.
2024/0070994 A1* 2/2024 Mahalingam .......... G06V 20/20
2024/0071605 A1 2/2024 Bradley et al.
2024/0103636 A1* 3/2024 Lindmeier .......... G06F 3/04845
2024/0126369 A1* 4/2024 Fujita ...................... G06F 3/014
2024/0402981 A1 12/2024 Tessmann et al.
2024/0402982 A1 12/2024 Morsy et al.

OTHER PUBLICATIONS

U.S. Appl. No. 18/394,825, Non-Final Office Action mailed Aug. 7, 2025, 10 pages.

U.S. Appl. No. 18/394,899, Non-Final Office Action, Mailed on Apr. 17, 2025, 17 pages.

"How to use the Virtual Headphones", Vinyl Reality Wiki, Available online at: https://vinyl-reality.com/wiki/doku.php?id=how_to_use_the_virtual_headphones, May 14, 2019, pp. 1-2.

"Master DJ Lessons in VR With Vinyl Reality // OCulus Rift + Touch // GTX 1060 (6GB)", Paradise Decay, Available online at: https://www.youtube.com/watch?v=Stqafits5ms, Aug. 21, 2018, 2 pages.

"Mixer Input Control Overview", Vinyl Reality Wiki, Available online at: https://vinyl-reality.com/wiki/doku.php?id=mixer_input_control_overview, Aug. 5, 2020, 4 pages.

Behrens , "Hardware, Software: Alles, was du als VR-DJ zum Auflegen brauchst", Bonedo, Available online at: https://www.bonedo.de/artikel/hardware-software-alles-was-du-als-vr-dj-zum-auflegen-brauchst/, Jun. 13, 2019, pp. 1-29.

European Application No. 24179428.8 , "Extended European Search Report", Sep. 30, 2024, 11 pages.

U.S. Appl. No. 18/394,763, "Notice of Allowance", Dec. 8, 2025, 18 pages.

U.S. Appl. No. 18/394,825, "Notice of Allowance", Dec. 10, 2025, 12 pages.

Chen, et al., "Exploring User Defined Gestures for Ear-based Interactions", Proceedings of the ACM on Human-Computer Interaction, vol. 4, Nov. 4, 2020, pp. 1-20.

U.S. Appl. No. 18/394,899, "Final Office Action", Sep. 22, 2025, 16 pages.

* cited by examiner

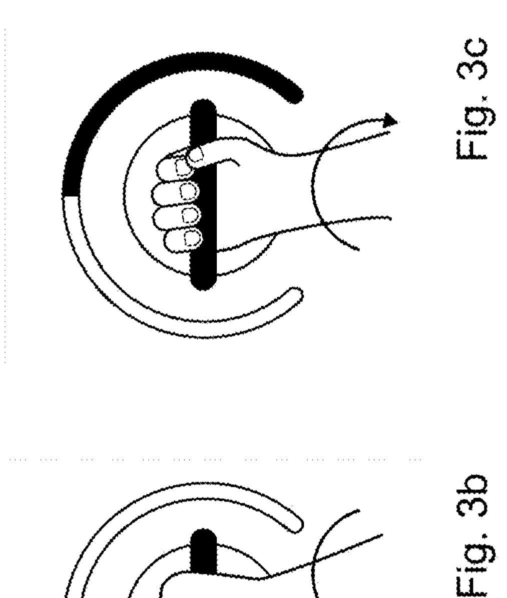
Fig. 3c
Fig. 3b
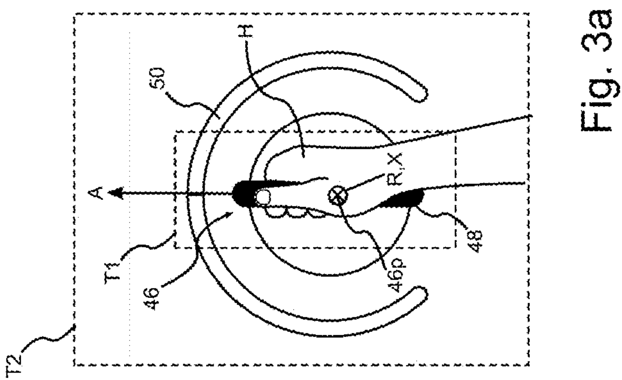
Fig. 3a

ARTIFICIAL REALITY BASED SYSTEM, METHOD, AND COMPUTER PROGRAM FOR MODIFYING AUDIO DATA BASED ON GESTURE DETECTION

CROSS-REFERENCE TO RELATED APPLICATIONS

This non-provisional application claims priority to U.S. Patent application No. 63/505,834, filed on Jun. 2, 2023, the disclosure of which is herein incorporated by reference in its entirety for all purposes.

DESCRIPTION

The present invention relates to a system, a method and a computer program for processing audio data, in which audio data representing a piece of music are processed to obtain output data, and output data are played back, wherein processing of the audio data may be modified based on user input.

Systems for processing audio data are conventionally known as for example music players or DJ systems adapted to play back music and to allow a user to manipulate the audio data in various ways before playback, for example by applying audio effects or filters, such as equalizers, modifying the volume, mixing the audio data with audio data from a different piece of music, etc. Especially for professional DJ equipment, a large variety of control elements is usually provided to modify the sound of audio data by filtering or enhancing certain frequencies of the sound or applying other audio effects, such as reverberation, loop effects, etc.

Conventionally, a music player and in particular a DJ system includes a hardware controller having a number of hardware control elements, such as switches, faders, buttons or rotary knobs, which can be physically touched and manipulated by the user to modify the audio data. One of the most common control elements is a multiband equalizer, for example a three-band equalizer, which comprises faders for adjusting the volume of different frequency bands, for example a LOW fader for filtering low frequencies, a MID fader for filtering medium frequencies and a HIGH fader for filtering high frequencies.

In a next stage of technical evolution, some or all of the functionalities of music players or DJ systems have been implemented by a computer program, which displays, on a computer display such as a tablet computer display or a smartphone display, the layout of a virtual music player or a virtual DJ system, wherein a user can interact with the system through a touchscreen or conventional pointing devices (mouse, trackpad etc.). Virtual audio equipment therefore does not need dedicated hardware controllers anymore but may use standard computer hardware, such as tablets or smartphones.

The transition from hardware music players or hardware DJ systems towards virtual devices displayed on a computer screen has shown to be challenging with regard to user acceptance, because handling of the control elements is less natural and sometimes more difficult than handling of conventional hardware control elements. In particular, for professional use, quick and reliable manipulation of control elements is essential, and it turned out that finding, gripping and manipulating virtual rotary knobs or faders can be unreliable and less intuitive, due to the missing haptic feedback to the user. Specifically in the case of rotary knobs, it is not possible to adopt the natural rotating movement to a virtual control element, because a touch gesture or a mouse pointer can obviously not be rotated. As a result, less intuitive workarounds are necessary, such as clicking on the virtual rotary knob and dragging the knob in a linear direction upwards or downwards to initiate rotation.

It is an object of the present invention to address the above-mentioned problems of the prior art and to provide a system, method, and computer program for processing audio data, which allow modification of audio processing through an intuitive, quick, and reliable user interaction.

According to a first aspect of the invention, the above object is achieved by a system for processing audio data, comprising an audio input unit for receiving input data, the input data being audio data representing a piece of music, an audio processing unit for processing the input data to obtain output data, an audio output unit for playing the output data, and a gesture detecting unit for detecting a grip-rotate gesture of a hand of a user, wherein the grip-rotate gesture comprises a sequence of (1) a gripping action, which corresponds to gripping a rod-shaped virtual grip, wherein the virtual grip has a longitudinal axis defining a gripping axis, and (2) a rotating gesture, which corresponds to rotating the virtual grip by a rotational angle about a rotational axis, said rotational axis being substantially orthogonal to the gripping axis, wherein the audio processing unit is connected to the gesture detecting unit and the audio output unit such as to modify processing of the input data depending on the rotational angle detected by the gesture detecting unit, while continuing playback of the output data.

According to an important feature of the invention, the system comprises a gesture detecting unit for detecting a grip-rotate gesture of a hand of a user and the audio processing unit is configured to modify processing of the input data depending on a rotational angle detected in the grip-rotate gesture, while continuing playback of the output data. In this manner, audio manipulation can be achieved through a natural and intuitive hand gesture combination of gripping and rotating, wherein a user performs a gesture or action as gripping a rod-shaped virtual grip and rotating the virtual grip. Since the virtual grip is rod-shaped and has a longitudinal axis, it invites the user to perform a gripping action in a natural and intuitive manner.

A gripping action can be performed quickly and reliably and can further be easily distinguished from other gestures by the gesture detecting unit. When using a touchless user interface, such as gesture detection by a camera, a gripping action can easily be detected based on a typical gripping gesture of the hand. When using a handheld controller, a gripping action can reliably be detected by activation of a respective control element, such as a trigger button. Furthermore, since the rotating gesture has a rotational axis substantially orthogonal to the gripping axis, such gesture corresponds to the natural movement that can easily be performed by the hand of a user when the hand assumes a gripping posture. For example, the rotational axis may substantially be in line with the longitudinal direction of a forearm of the user, which allows an ergonomic grip-rotate gesture.

It should be noted in the context of the present invention that a hand posture of a hand of a user is used herein as describing a current form of the hand as regards finger position, angle of the palm with respect to the forearm, etc. Postures are for example a flat hand, a fist, flexion of individual or all fingers, etc. Furthermore, a hand gesture is herein used as describing a movement of the hand or parts of the hand in space, optionally in combination with a particular hand posture, or a sequence of movements of the hand in space or a sequence of hand postures or a change in hand posture.

As described above, audio processing is modified based on the detected grip-rotate gesture while continuing playback of the output data. This means that audio manipulation can be performed by the user while the output data are played back continuously, such that the user can change the sound of the piece of music directly during playback, for example by applying certain filters or effects at various levels. In a preferred embodiment, the audio processing unit is an equalizer or a frequency filter, wherein at least one operating parameter of the audio processing unit is set depending on the rotational angle detected by the gesture detecting unit. Equalizers and frequency filters are control elements, which need to be quickly accessible, especially for DJs, in order to modify the sound to perform particular artistic effects or transitions. The operating parameter can then be adjusted quickly and easily by rotating the virtual grip, wherein the operating parameter is preferably selected from the group consisting of filter frequency, filter gain and filter bandwidth, a filter mode (low pass, high pass), or a volume of an individual instrument as obtained from a source separation process of the audio data.

In another preferred embodiment of the invention, the gesture detecting unit is adapted to detect the rotational angle within a predefined angular range between a minimum rotational angle and a maximum rotational angle, and wherein rotational angles within the predefined angular range are mapped to respective operating values of at least one operating parameter of the audio processing unit, and wherein the size of the angular range is preferably between 120 degrees and 240 degrees, more preferably between 165 degrees and 195 degrees. In this way, the operating parameter of the audio processing unit can easily be set to assume different values by rotating the virtual grip into different rotational angles, respectively. If the size of the angular range is between 120° and 240°, the movability of a human's hand with regard to rotation of the hand around the longitudinal axis of the forearm can be best utilized and the user has a natural and intuitive physical feedback of a left end position and a right end position of the control movement due to the anatomic range of movability of the hand. A minimum value and a maximum value of the operating parameter is therefore accessible quickly and reliably. At the same time, the full operational range of the operating parameter can be accessed without having to release the grip and newly perform the gripping action. Furthermore, if the size of the angular range of the operating parameter is between 165° and 195°, the usability of the virtual grip for adjusting the operating parameter within its operational range between a minimum on the left side and a maximum on the right side, for example, can be improved even more. A rotational movement of the user's hand about an angle of about 180° is very reliable and easy to learn.

According to a further embodiment of the present invention, the gesture detecting unit is adapted to detect whether the grip-rotate gesture is a valid grip-rotate gesture or not, wherein the valid grip-rotate gesture comprises a sequence of (1) a valid gripping action which is the gripping action performed while the hand of the user is detected to be within a first tolerance zone around a predetermined virtual grip position which is a predetermined position of the virtual grip within an area around the user, and (2) a valid rotating gesture, which is the rotating gesture while the hand of the user is detected to be within a second tolerance zone around the predetermined virtual grip position, wherein the audio processing unit is adapted to activate a gesture control mode, i.e. a control mode in which processing of the input data is modified depending on the rotational angle detected by the gesture detecting unit, only if the grip-rotate gesture is a valid grip-rotate gesture. Otherwise, if no valid grip gesture is detected, the gesture control mode is deactivated or remains deactivated, such that hand gestures do not influence the audio processing.

With the above embodiment, it is avoided that an unwanted audio processing is initiated if a user is performing a grip-rotate gesture unintentionally. By setting a predetermined first tolerance zone and detecting a valid gripping action only when the hand of the user is within this first tolerance zone, the user needs to actively move her/his hand to a certain position space to activate the gesture control mode. Furthermore, by defining a valid rotating gesture as a rotating gesture while the hand of the user is within a second tolerance zone, it can be ensured that the gesture control mode is terminated as soon as the hand leaves the second tolerance zone, i.e. when the user obviously does not intend to further continue the gesture control mode. As a result, the gesture control mode may be terminated as soon as the position of the user's hand detected by the gesture detecting unit is outside the second tolerance zone.

As an alternative or in addition, the gesture control mode may be terminated as soon as the gesture detecting unit detects a release of the gripping action, i.e. a change of a gripping posture towards another posture, even if the hand of the user is detected to be still within the second tolerance zone, or even if the hand of the user is detected to be within the first tolerance zone.

Preferably, the first tolerance zone is smaller than the second tolerance zone. In this way, a user needs to more precisely position her/his hand within the first tolerance zone in order to activate a gesture control mode, such that unintended modification of audio processing can be avoided. On the other hand, as soon as a valid gripping action is performed and the user has started rotating the virtual grip in order to modify an operational parameter of the audio processing unit, the gesture control mode is maintained even if the user's hand leaves the first tolerance zone but remains within the second tolerance zone. This supports an intuitive operation of the system as the user is willing to more precisely focus on gripping a virtual grip in order to initiate the gesture control mode but may then wish to change her/his focus towards other control tasks, in particular change gaze direction towards other directions, while continuing manipulation of the virtual grip. On the other hand, by setting the second tolerance zone to a specific value, an intentional termination of the gesture control mode can be ensured when the user's hand is clearly moved away from the virtual grip position.

In a further preferred embodiment of the invention, the system further comprises an artificial reality apparatus adapted to provide visual input for the user to create an artificial reality environment, wherein the artificial reality apparatus is adapted to display the rod-shaped virtual grip at a predetermined virtual grip position in space within an area around the user. This allows displaying the rod-shaped virtual grip to the user such as to invite the user to perform the grip-rotate gesture. In particular, by displaying the virtual grip as a rod-shaped grip, the user is guided to perform a natural gripping movement with her/his hand.

In the context of the present disclosure, an artificial reality apparatus (XR apparatus) may include a virtual reality apparatus (VR) in which a user's virtual input over substantially the entire field of view is controlled by a computer, wherein the computer displays a virtual environment and virtual objects visible in an area (a three-dimensional space) around the user. The term artificial reality (XR) may also include augmented reality (AR) in which the user views camera images of the real world, wherein the images may be modified, for example by adding virtual objects thereto. Furthermore, the term artificial reality (XR) may include mixed reality (MR), in which the user views a mixture of light coming directly from the real world and light coming from a computer display. MR may for example be realized by a headset comprising a semi-transparent glass allowing the user to see through the semi-transparent glass the real world, wherein at the same time virtual objects are displayed to the user at the semi-transparent glass by a display or a projector. In general, XR (including VR, AR, and MR) may be realized by using a headset, such as glasses, which displays or projects images to both eyes of the user, such that the user views artificial objects and an artificial environment in the three-dimensional space surrounding the user. Artificial reality (XR) herein refers to any of VR, AR or MR or combinations thereof. An example of a conventional XR apparatus is a device available on the marked as “Meta Quest Pro”.

An artificial reality system is able to display a virtual object within the three-dimensional space around the user, such that the user recognizes the object as being positioned at a particular position in space. Therefore, unlike the situation on a two-dimensional display, such as a tablet display in which the same tablet is viewed with both eyes of the user, the artificial reality apparatus is able to provide a fully immersive experience to the user in which objects are recognized as being arranged at any position in the three-dimensional space. Alternative solutions to headsets are known in the art to create artificial reality (XR), for example caves, which can be entered by the user and which have artificial reality content displayed on the walls of the cave, or holograms.

Preferably, the rod-shaped virtual grip has a longitudinal rod portion defining, along its longitudinal axis, the gripping axis of the virtual grip, wherein the artificial reality apparatus is adapted to display the virtual grip with its gripping axis oriented substantially orthogonally to a radial X direction of the user, wherein the radial X direction is defined as a direction starting from the user and pointing substantially horizontally in a distal direction. In this way, the rod-shaped virtual grip can be displayed such that it can be gripped by a user in an ergonomic and comfortable manner without bending or twisting the hand unnecessarily.

It is furthermore preferred that the rod-shaped virtual grip has a longitudinal rod portion defining, along its longitudinal axis, the gripping axis of the virtual grip, wherein the rod portion is displayed as having dimensions according to at least one of the following features: (a) a length of the rod-shaped portion is between about 0.04 m and about 0.60 m, preferably between about 0.06 m and about 0.30 m, (b) a width of the rod-shaped portion, preferably along its entire length, is smaller than 0.12 m, preferably between 0.02 m and 0.07 m, and (c) a length-to-width ratio of the rod-shaped portion is larger than 1.5, preferably larger than 3.

With the length of the rod-shaped portion being between 0.04 m and 0.60 m, the direction of the longitudinal axis of the virtual grip is most clearly recognizable for the user such as to make the gripping action more reliable. Best handling can be achieved with a length of the rod-shaped portion between about 0.06 m and 0.30 m. In particular, when the length of the rod-shaped portion is greater than 0.06 m, the user is invited to grip the virtual grip with a full-hand grip posture, such that all fingers are wrapped around the rod-shaped portion.

When the width of the rod-shaped portion is smaller than 0.12 m, the user has the impression that she/he can readily wrap her/his fingers around the grip, thus further inviting the gripping action. Best results are achieved when a width of the rod-shaped portion is between 0.02 m and 0.07 m.

In addition, with a length-to-width ratio of the rod-shaped portion being greater than 0.1 m, a longitudinal gripping axis of the virtual grip can be recognized more clearly. If the ratio is above 3, very reliable gripping is achieved.

It should be noted that in an embodiment as described above, in which the gesture detecting unit is adapted to detect whether the grip-rotate gesture is a valid grip-rotate gesture or not, and in which a valid gripping action is the gripping action performed while the hand of the user is detected to be within the first tolerance zone around the predetermined virtual grip position, the artificial reality apparatus may in particular be configured to display the rod-shaped virtual grip at a predetermined virtual grip position within the first tolerance zone. Movement of the hand towards a valid gripping action within the first tolerance zone may therefore be guided by the artificial reality apparatus, such that a user can easily and quickly find the correct position in space for her/his hand to be positioned in order to perform a valid grip-rotate gesture.

In a further preferred embodiment of the invention, the virtual grip position is at the same level or higher than a user’s shoulder height. This allows the user to operate the system while assuming an upright standing or upright sitting body posture with novel and more ergonomic movements that can utilize a large part of the area in front of the user. If grips are displayed by the artificial reality apparatus at virtual grip positions at or higher than the user’s shoulder height, such virtual grips may be displayed as being transparent or semi-transparent or translucent, in order to allow background light to shine through the virtual grip, such as to reduce occlusion of the background by the grips.

In a further preferred embodiment of the present invention, the artificial reality apparatus is adapted to display a grip tag in association with the virtual grip, preferably attached to the virtual grip, wherein the grip tag shows information regarding the current modification of the processing of the input data depending on the rotational angle, preferably the operating parameter of the audio processing unit as currently set depending on the rotational angle detected by the gesture detecting unit. By means of the grip tag, precise adjustments of the operating parameter that is controlled based on the detected rotational angle of the rod-shaped virtual grip can be achieved, since the user has feedback regarding the value of the operating parameter or the amount of modification of audio processing directly through the grip tag.

The grip tag may be displayed by the artificial reality apparatus as a circle or part of a circle around the rotational axis of the virtual grip, wherein the circle or circle part may comprise a marked circle segment having an angle along the circle or circle part which is equal to or corresponds to the rotational angle detected by the gesture detecting unit. A circle grip tag is useful for providing a clear visual feedback of the operating movement of the virtual grip, in particular the rotational angle about which the virtual grip is currently rotated.

In a preferred embodiment of the present invention, the gesture detecting unit comprises a camera adapted to capture images of the user’s hand, and a gesture recognition unit adapted to analyze the images captured by the camera, based on gesture data relating to at least one expected hand gesture. Camera-based gesture detection allows a hands-free, natural operation of the system by just moving the hands to certain postures or performing certain gestures. In this way, it is not necessary to provide hardware controllers, and it is not necessary for the user to hold a hardware controller during operation of the system. This also greatly supports a natural gripping action for operating the virtual grip.

In an alternative embodiment of the invention, the gesture detecting unit comprises a controller which is a wearable or a handheld controller, wherein the controller comprises at least one sensor element for detecting a hand movement and/or at least one hardware control element which can be controlled by the user's hand. A wearable or handheld controller can be a more cost-effective and more reliable solution to detect the precise position of a user's hand in space as well as to detect a gripping action through activation of a hardware controller switch or directly sensing finger movement via a sensor provided at the hand of the user.

According to a second aspect of the present invention, the above-mentioned object is achieved by a method for processing audio data, comprising the steps of: receiving input data which are audio data representing a piece of music, processing the input data to obtain output data, playing the output data, detecting, by using a gesture detecting unit, a grip-rotate gesture of a hand of a user, wherein the grip-rotate gesture comprises a sequence of (1) a gripping action, which corresponds to gripping a rod-shaped virtual grip, wherein the virtual grip has a longitudinal axis defining a gripping axis, and (2) a rotating gesture, which corresponds to rotating the virtual grip by a rotational angle about a rotational axis, said rotational axis being substantially orthogonal to the gripping axis, modifying processing of the input data depending on the rotational angle detected by the gesture detecting unit, while continuing playback of the output data.

With a method according to the second aspect of the invention, the same effects and advantages can be achieved as described above for a system of the first aspect of the present invention. In particular, a method of the second aspect may be carried out by a system according to the first aspect.

Further embodiments of the method of the second aspect of the invention are described below with reference to the following items:

Item 1: The method of the second aspect, wherein the audio processing unit is at least one of an equalizer, frequency filter, loop effect unit, a pitch effect unit, an audio effect unit, and a source separation unit decomposing the input data into a plurality of audio data representing different instruments or vocal components included in the input data, wherein at least one operating parameter of the audio processing unit is set depending on the rotational angle detected by the gesture detecting unit, wherein the operating parameter is preferably selected from the group consisting of filter frequency, filter gain and filter bandwidth, gain of a frequency or frequency range, a looping parameter, a pitch, an audio effect (FX) parameter, or a volume or other parameter of an instrument or a vocal component.

Item 2: The method of the second aspect or item 1, wherein the detected rotational angle is within a predefined angular range between a minimum rotational angle and a maximum rotational angle, wherein rotational angles within the predefined angular range are mapped to respective operating values of at least one operating parameter of the audio processing unit, and wherein the size of the angular range is preferably between 120° and 240°, more preferably between 165° and 195°.

Item 3: Method of the second aspect or item 1 or item 2, further comprising detecting whether or not the grip-rotate gesture is a valid grip-rotate gesture, wherein the valid grip-rotate gesture comprises a sequence of (1) a valid gripping action, which is the gripping action performed while the hand of the user is detected to be within a first tolerance zone around a predetermined virtual grip position, which is a predetermined position of the virtual grip within an area around the user, and (2) a valid rotating gesture, which is the rotating gesture while the hand of the user is detected to be within a second tolerance zone around the predetermined virtual grip position, wherein a gesture control mode, in which processing the input data is modified depending on the rotational angle, is activated only if the grip-rotate gesture is a valid grip-rotate gesture, and wherein the first tolerance zone is preferably smaller than the second tolerance zone.

Item 4: Method of the second aspect or method according to items 1 to 3, further comprising providing visual input for the user to create an artificial reality environment by using an artificial reality apparatus, and displaying the rod-shaped virtual grip by the artificial reality apparatus at the predetermined virtual grip position in space within an area around the user, wherein the artificial reality apparatus is preferably configured as described above with reference to the embodiments of the first aspect of the present invention.

In a preferred embodiment of the method of the second aspect of the invention, the method further comprises a teaching process which comprises the steps of requesting a user to carry out a grip-rotate gesture, wherein the gesture request comprises (1) prompting the user to perform a gripping action, which corresponds to gripping a rod-shaped virtual grip, wherein the virtual grip has a longitudinal axis defining a gripping axis, and (2) prompting the user to perform a rotating gesture, which corresponds to rotating the virtual grip by a rotational angle about a rotational axis, said rotational axis being substantially orthogonal to the gripping axis; and observing, by using the gesture detecting unit, a gesture performed by the user in response to the gesture request; preparing gesture data based on the observed gesture, wherein the gesture detecting unit is adapted to detect a current grip-rotate gesture by observing a current gesture and analyzing the current gesture based on the gesture data previously prepared within the teaching process.

The teaching process described above for this embodiment of the invention allows a more reliable detection of a grip-rotate gesture during operation of the system through adaption of the sensitivity of the gesture detection to a particular user of the system. Furthermore, the user can be given a feedback regarding his/her gripping action such as to improve handling of the virtual grip.

According to a third aspect of the invention, the above object is achieved by a computer program product adapted to carry out, when run on at least one computer, a method according to the second aspect of the present invention. Furthermore, a system according to the first aspect of the invention may run a computer program according to the third aspect of the invention, such as to achieve the effects described above with respect to the first aspect of the invention.

Figure 2:
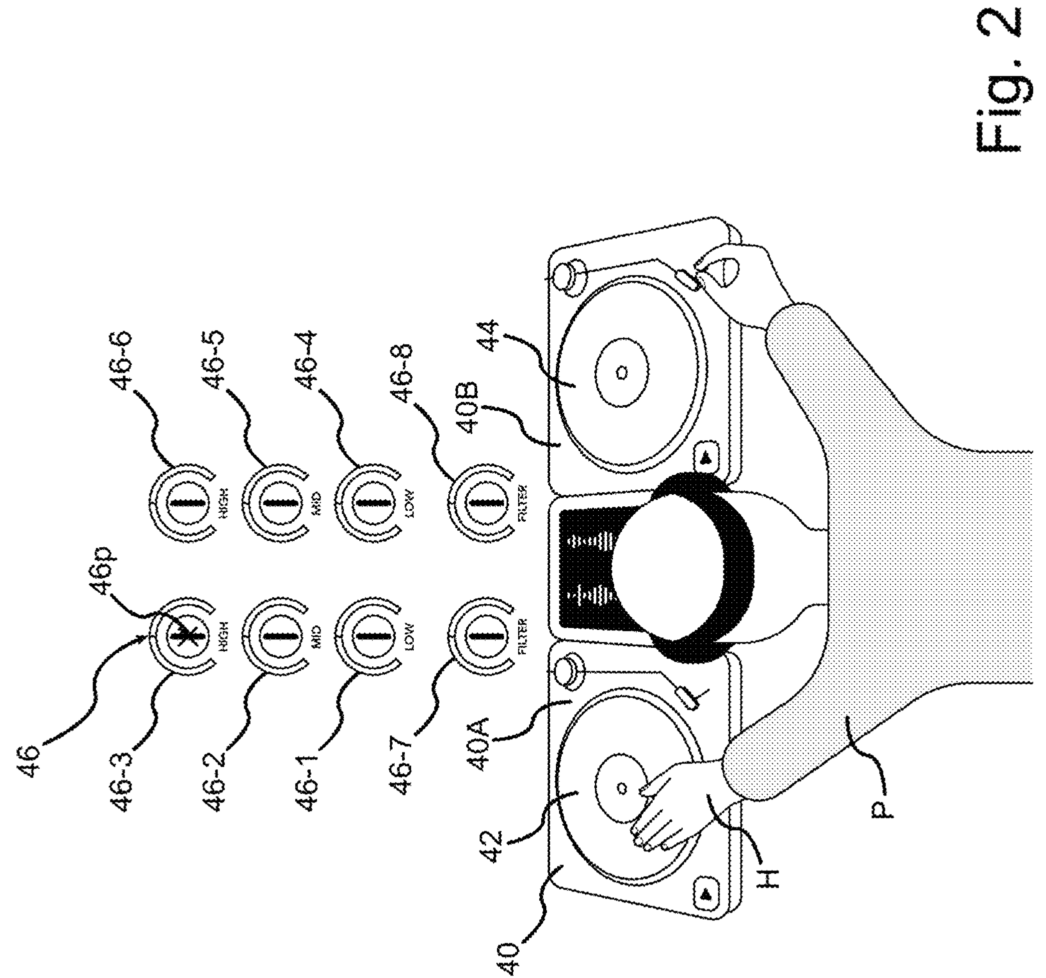
Figure 4:
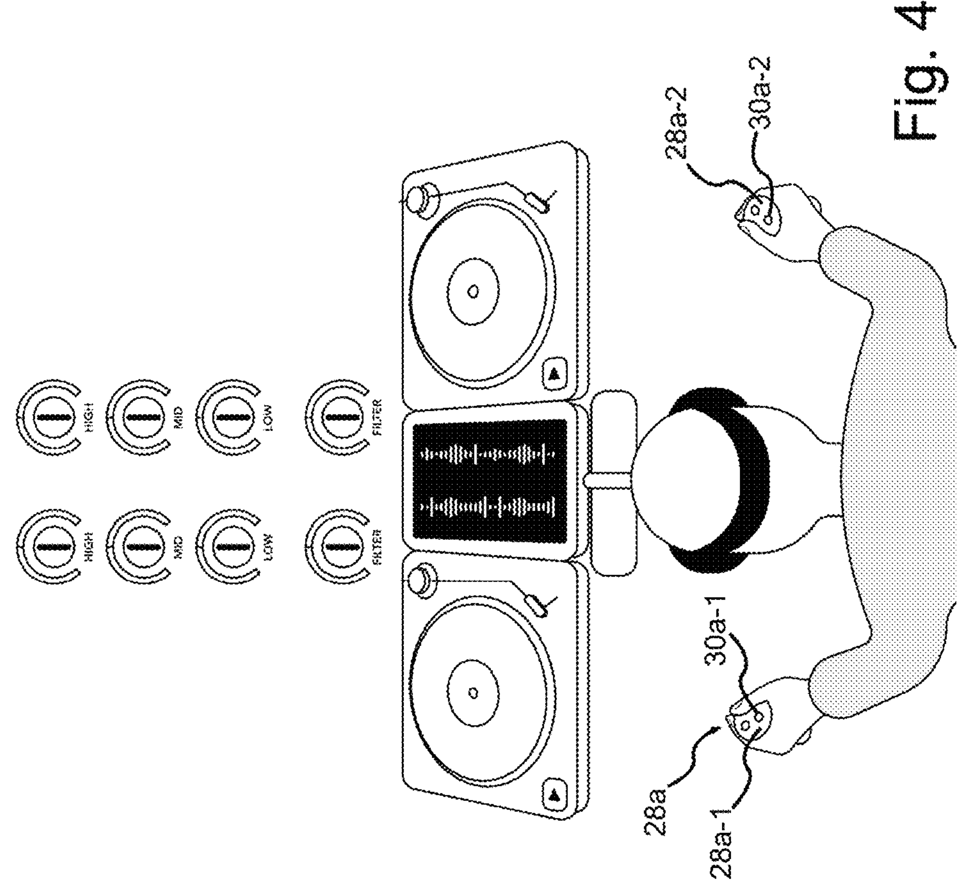

Preferred embodiments of the invention will now be described with reference to the drawings, in which FIG. 1 is a schematic illustration of a system for processing audio data according to a first embodiment of the present invention, FIG. 2 is a functional illustration of the system according to the first embodiment together with an illustration of an artificial reality environment generated by the system, FIGS. 3A, 3B and 3C are illustrations of virtual grips displayed by the system in artificial reality, wherein FIGS. 3A, 3B and 3C illustrate different rotational positions during a grip-rotate gesture of a user's hand, FIG. 4 is a schematic illustration of a system for processing audio data according to a second embodiment of the present invention, including an illustration of an artificial reality environment as generated by the system.

With reference to FIG. 1, a system 10 for processing audio data according to the first embodiment of the present invention generally comprises an audio input unit 12, an audio processing unit 14 and an audio output unit 16. Audio input unit 12 is configured to receive input data, which are audio data representing a piece of music such as a song, for example via streaming through the Internet from a remote music library 17, which may be a commercial music distribution platform (for example Apple Music or Spotify). Alternatively, audio input unit 12 may receive audio data from a local storage device, for example a local hard drive integrated in or connected to the system 10. The piece of music may be provided to or by the audio input unit 12 in any conventional digital format, in particular standard audio formats, such as MP3, WAV, AIFF, etc. The audio data may be provided in a decompressed format and/or audio input unit 12 may include a decompressor for decompressing audio data received in compressed format.

Audio processing unit 14 is preferably connected to audio input unit 12 to receive input data from audio input unit 12, and is configured to process the input data so as to obtain output data, which are sent to audio output unit 16 for output. Audio processing unit 14 may have an operating mode, in which the input data are passed through without significant modification such that the output data resemble the input data. In another operating mode, audio processing unit 14 may modify the input data, for example by applying filters, audio effects, mixes with other audio data etc. In the present embodiment, audio processing unit 14 may include an equalizer 18 adapted to adjust the volume of at least one frequency band within the audio signal represented by the audio data. In the present embodiment, a 3-band equalizer is used which provides for adjustment of three frequency bands, LOW, MID and HIGH, as known as such from conventional equalizers. For each frequency band, preferably at least one operating parameter is selected from the group consisting of filter frequency (a central or reference frequency of the filter band), filter gain (a value representing increase or decrease of the volume of the volume of the frequencies within the filter band, usually measured in decibel), and filter bandwidth (a nominal width of the filter band, usually measured in hertz).

As an alternative or in addition to the equalizer 18, audio processing unit 14 may include a filter 20 such as a high-pass filter or a low-pass filter or a band-pass filter or any combination thereof, as known as such in the prior art for audio processing. An operating parameter of filter 20 may be a cut-off frequency of the filter.

Audio output unit 16 is configured to receive the output data from audio processing unit 14 and to process it for sound output. For this purpose, audio output unit 16 may include a digital-to-analog converter for converting the digital output data into analog audio signals, and may be connected to a pair of speakers 22 and/or to headphones 24 of a headset 26 wearable on a head of a user P, such as to eventually make the output data audible for the user P and optionally also for an audience. Preferably, system 10 is configured for processing stereo or multi-channel audio data, such that audio output unit 16 outputs the output data via at least two channels (in particular two stereo channels) including a left channel and a right channel sent to left and right speakers 22 or left and right sides of headphones 24, respectively. In this way, stereophonic or spatial audio is provided.

One or more of the above-described items as well as the items described below may be implemented by a computer 27, which includes a microprocessor, a volatile memory, i.e. a random-access memory (RAM), a non-volatile memory, i.e. a read-only memory (ROM) or a hard drive (HDD) or solid-state drive (SSD), and connectivity means, for example a wireless network interface (e.g. a Bluetooth interface or a WLAN interface), or a USB interface. Computer 27 may be a standard tablet computer, smartphone or desktop computer, and it may be carried on with the user P or disposed at a distance to user P. Computer 27 may be integrated into headset 26. In another embodiment, computer 27 may be implemented as a plurality of separate processing units parts of which being carried on with the user P and other parts being disposed stationary and/or remote with respect to the user, wherein the processing units are connected to one another by wireless connections (e.g. Bluetooth) or wire-based connections (e.g. USB) such as to implement the functions of the system 10 as described herein above and below.

System 10 further includes a gesture detecting apparatus 28 for detecting a position, a posture and a movement of a hand H of the user, and for recognizing hand gestures. Gesture detecting apparatus 28 may in particular include a camera 30 configured and positioned to capture images of a hand H of a user P. Camera 30 may be mounted to headset 26 and may for example be integrated into a display 32 of headset 26. Alternatively, camera 30 may be disposed at some distance to the user P and directed such as to view the user's hand H.

Gesture detecting apparatus 28 may further include an image-processing unit 34, which receives images captured by a camera 30 and a gesture-recognition unit 36, which receives images processed by image-processing unit 34. The gesture-recognition unit 36 is adapted to analyze the images captured by the camera in order to recognize at least one hand gesture. Interpretation of the camera images or camera videos may be based on an appearance-based model using a template database. For example, gesture-recognition unit 36 may compare images or sequences of images captured by camera 30 with reference images or reference image sequences taken from the template database, wherein the reference images or reference image sequences show particular known hand gestures of the same or another user, which have been previously captured by the same or a different camera. Based on a difference between the currently captured images of a hand H of a user P and the reference images or reference image sequences, gesture-recognition unit 36 may classify hand gestures and eventually decide whether a current hand gesture resembles a particular reference gesture.

In other embodiments of the invention, gesture detection apparatus 28 may use other concepts of gesture detection, for example based on data captured by 3D cameras such as stereo cameras or depth-aware cameras. Suitable algorithms for interpretation of 3D camera data are volumetric or skeletal models. Furthermore, electromyography-based models interpreting electrical signals produced by muscles in the body or data obtained from wired gloves may be used. In the first embodiment of the invention as shown in FIGS. 1 to 3*c*, a touchless user interface (TUI) is preferably used for gesture detection, i.e. an interface obtaining data related to hand gestures without physically touching a hardware controller, such as a handheld controller, a keyboard, a mouse, or a screen.

Alternatively or in addition, gesture detecting apparatus 28, in particular gesture-recognition unit 36, may include an artificial intelligence unit (not shown in FIG. 1), which may comprise a neural network trained to recognize particular hand gestures. The neural network may be trained using training data, which comprise images or image sequences of a hand gesture and associated identification of a particular hand gesture. After training, the trained neural network is then able to classify new hand gestures captured observed by the gesture detecting apparatus 28 and to decide whether or not the new hand gesture corresponds to a particular predefined hand gesture.

System 10 further includes an artificial reality (XR) apparatus 33 comprising the display 32 mounted on the headset 26 to be viewed by user P. Thus, display 32 may be an XR display 32 and headset 26 may be an XR headset 26. XR display 32 is configured and mounted to XR headset 26 in such a manner as to cover substantially the entire field of view of both eyes of user P such as to allow full or partial immersion of the user into an artificial surrounding generated by the XR apparatus. In particular, the XR apparatus is configured to display virtual objects at certain 3D positions in space in an area around user P, such that the user has an illusion of the objects actually existing at the respective positions. Furthermore, XR apparatus 33 may comprise an XR processing unit 38 for generating XR data to be displayed by XR display 32.

FIG. 1 and FIG. 2 illustrates an artificial environment as generated by the XR apparatus 33, wherein a number of virtual objects are projected at respective positions within the space in front of user P. In particular, a virtual DJ deck 40 with one or more virtual turntables 42 and 44 are displayed in front of user P at a lower position corresponding to a normal position of a DJ deck 40 when placed on a table in front of user P. In addition, one or more rod-shaped virtual grips 46 are displayed by the artificial reality apparatus 32, 38 at respective 3D virtual grip positions 46*p* in a 3D space (area) in front of user P. Preferably one or more virtual grips 46 are displayed at virtual grip positions in an upper area above DJ deck 40, more preferably at the height of a shoulder S of user P or higher.

The virtual grips 46 may be operated by hand gestures of user P to adjust operating parameters of the equalizer 18 and/or the filter 20. The virtual DJ deck may have only one panel to process and play audio data of one piece of music. However, as shown in FIG. 1 and FIG. 2, virtual DJ deck 40 may have two or more panels, such as a left panel 40A for processing and playing audio data of a first piece of music and a right panel 40B for processing and playing audio data of a second piece of music. Three virtual grips 46-1, 46-2 and 46-3 may be provided in association with the left panel 40A for adjusting LOW, MID and HIGH frequency bands of a left section of equalizer 18, wherein the virtual grips 46-1, 46-2 and 46-3 may be displayed in a first row in a left part of the artificial reality environment. Likewise, three virtual grips 46-4, 46-5 may be provided in association with the right panel 40B for adjusting LOW, MID and HIGH frequency bands of a right section of equalizer 18, wherein the virtual grips 46-4, 46-5 and 46-6 may be displayed in a second row in a right part of the artificial reality environment.

Furthermore, a virtual grip 46-7 for adjusting a cutoff frequency of a left filter for the left panel 40A of DJ deck 40 may be provided in the left part of the artificial reality environment, while a virtual grip 46-8 for adjusting a cutoff frequency of a right filter for the right panel 40B of DJ deck 40 may be provided in the right part of the artificial reality environment. Left filter and/or right filter may be at least one of a high-pass filter, a low-pass filter, a band filter or a combination thereof.

Configuration and operation of the virtual grip 46, exemplary for one or more of the virtual grips 46-1 to 46-8, is further illustrated with respect to FIGS. 3*a*, 3*b* and 3*c*. As shown therein, virtual grip 46 comprises a longitudinal rod portion 48 defining, along its longitudinal axis, a gripping axis A of the virtual grip 46. Gripping axis A is substantially orthogonal to a radial direction X of the user P, i.e. a direction starting from the user P and pointing substantially horizontally in a distal direction. Thereby, the virtual grip 46, in particular the rod portion 48 of the virtual grip 46, has a typical grip shape with a length slightly longer than the width of a palm of a human hand and a suitable thickness inviting the user to perform a grip gesture by wrapping the fingers of the hand H around the grip.

A rotational axis R is defined for the virtual grip 46 as orthogonally intersecting the gripping axis A. Upon detection of a rotating gesture of the user's hand H by the gesture detecting apparatus 28, 30, the rod-shaped portion 48 of virtual grip 46 is displayed as being rotated about the rotational axis R in accordance with the detected rotating gesture, such that the gripping axis A of the rod portion 48 coincides with the actual gripping axis of the hand H. Therefore, the user P has the impression of actively rotating the virtual grip 46 about the rotational axis R.

Virtual grip 46 may have a predefined angular range between a minimum rotational angle or a left-hand side rotational end position as shown in FIG. 3B, and a maximum rotational angle or right-hand side end position as shown in FIG. 3C, wherein the size of the angular range may be about 180° as in the illustrated embodiment. The minimum rotational angle is preferably mapped to a minimum value of the associated operating parameter, for example a minimum gain of the associated filter band of the equalizer 18, while the maximum rotational angle is mapped to a maximum value of the associated operating parameter, for example a maximum gain of the associated filter band of the equalizer 18. Rotational angles between the minimum rotational angle and the maximum rotational angle are mapped to respective operating values between minimum and maximum. In this way, the user P may adjust the operating value between its minimum value and its maximum value by rotating the hand H between the minimum and maximum rotational positions. Since the natural movability of a human's hand with respect to rotation about the axis of the forearm is about 180°, the user feels a natural limit for the rotational movement at the minimum rotational angle as well as at the maximum rotational angle, which enhances intuitive operation of the virtual grip 46.

As further shown in FIGS. 2, 3A, 3B and 3C, the XR apparatus 33 may display a grip tag 50 in association with the virtual grip 46, which shows information about the current rotational angle assumed by the virtual grip 46. Grip tag 50 may be of circular shape with a center coinciding with the rotational axis R of the virtual grip 46. For example, grip tag 50 may include a circular marking 52 which has a minimum circumferential extension when the virtual grip 46 is in a center position or neutral position (for example an upright position) as shown in FIG. 3A, wherein the extension of the marking 52 increases along the circular tag 50 in clockwise direction, when the virtual grip 46 is rotated clockwise from the center position towards the right-hand side end position, while it increases its extension along the circular tag 50 in counterclockwise direction when the virtual grip 46 is rotated counterclockwise towards the left-hand side end position. This provides additional visual feedback for the user regarding the current rotational angle of the virtual grip 46. In addition or alternatively to grip tag 50, textual information regarding the current value of the operating parameter may be displayed near or attached to the virtual grip 46.

Furthermore, XR apparatus 33 may display an artificial representation of the user's hand H (i.e. a virtual computer-generated hand) in accordance with the current position and posture/gesture of the hand H detected by the gesture detecting apparatus 28, such as to provide visual feedback to the user regarding the detecting result of the gesture detecting apparatus 28. Alternatively, the XR apparatus may implement AR or MR capabilities in order to let the user view a live-camera image of her/his hand H or real light coming from her/his hand H.

Operation of system 10 is now explained with reference to the drawings. In a first step of the operation, audio data may be received by audio input unit 12 and processed within audio processing unit 14 with the operating parameters of the equalizer 18 and/or the filter 20 being set to default values. For example, the filter gain of all filter bands of the equalizer may be set to zero, such as to neither increase nor decrease the volume of any frequency within the audio data. Likewise, the cutoff frequency of filter 20 may be set such that the filter 20 does not modify the audio data (for example the cutoff frequency of the low-pass filter is set to a maximum value and/or the cutoff frequency of a high-pass filter is set to a minimum value). The audio data therefore pass through the audio processing unit 14 substantially without modification, such that the output data substantially correspond to the input data. Furthermore, the output data are played back through the audio output unit 16 and speakers 22 and/or headphones 24.

At the same time, XR apparatus 33 displays the virtual grips 46 at their respective virtual grip positions in the space around the user P inviting the user P to grip and manipulate the virtual grips 46. Gesture detecting apparatus 28 continuously observes position, movement and posture of a hand H of the user P and, at some point in time, may detect a valid gripping action, when two conditions are fulfilled: (1) the user's hand H assumes a gripping posture, and (2) the position of the hand H as detected by the gesture detecting apparatus 28 is within a first tolerance zone T1 defined around the virtual grip position 46*p* of the respective virtual grip 46. As can be seen in FIG. 3A, the first tolerance zone may have a longitudinal shape, such as to fully surround the rod portion 48 of the virtual grip 46.

Gesture detecting apparatus 28 may then detect a valid rotating gesture of the hand H when the hand of the user is positioned within a second tolerance zone T2 around the virtual grip position 46*p*, provided that the hand maintains the grip posture. As can be seen in FIGS. 3A, 3B and 3C, the second tolerance zone T2 is larger than the first tolerance zone T1 and fully surrounds the first tolerance zone T1, such as to tolerate larger movements of the user's hand away from the virtual grip position 46*p*, once a valid gripping action within the first tolerance zone T1 is detected.

Upon detection of a valid gripping action and a valid rotating gesture, system 10 activates a gesture control mode, in which the rotational angle of the user's hand H as detected by the gesture detecting apparatus 28 during the valid grip-rotate gesture is used for modifying the processing of the input data within audio processing unit 14, i.e. is used to set the operating value of equalizer 18 and/or filter 20 to a particular value associated with the detected rotational angle. It should be noted that during the grip-rotate gesture of the user and accordingly modifying processing of the input data within audio processing unit 14, i.e. within the gesture control mode, playback of the output data preferably continues without interruption, such that live manipulation of the audio data is achieved by system 10.

Furthermore, in a next step of the operation, the gesture control mode may be deactivated (terminated) when the gesture detecting apparatus 28 detects that the hand H of the user P leaves the second tolerance zone T2, i.e. the position of the user's hand Has detected by the gesture detecting apparatus 28 moves to a position outside the second tolerance zone T2. In addition or alternatively, the gesture control mode may be deactivated when the gesture detecting apparatus 28 detects a change in hand posture of the hand H from a gripping posture towards a different posture, for example when expanding one or more fingers.

When the gesture control mode is deactivated, the at least one operating parameter of the audio processing unit 14 preferably maintains its value or values as last set through the grip-rotate gesture. Alternatively, the operating parameter may be reset to default values.

FIG. 4 shows a second embodiment of the present invention, which is a modification of the first embodiment of the present invention, such that only differences with respect to the first embodiment will be explained in more detail and reference is made to the description of the first embodiment for all other features and functions.

In the second embodiment, a gesture detecting apparatus 28*a* comprises a pair of handheld hardware controllers 28*a*-1, 28*a*-2 to be held by a left hand and a right hand of the user, respectively. The controllers 28*a*-1 and 28*a*-2 include inertia sensors and/or gyroscopic sensors for detecting position and/or orientation of the controllers 28*a*-1 and 28*a*-2 in space and for detecting a movement of the controllers 28*a*-1 and 28*a*-2 in space, such that position and movement can be detected individually for both hands.

Furthermore, controllers 28*a*-1 and 28*a*-2 may each comprise one or more hardware controller switches 30*a*-1 and 30*a*-2, which may be manually operated, i.e. physically touched, by respective fingers of the hands of the user in order to trigger certain events and operations of the system.

In order to enter and maintain a gesture control mode in which audio processing is modified based on a detected hand gesture as described in the first embodiment, the gesture detecting apparatus 28*a* of the second embodiment may detect a valid grip-rotate gesture as comprising (1) operating (by physically touching) at least one of the hardware control switches 30*a*-1, 30*a*-2, while the hand of the user is detected to be within a first tolerance zone around a predetermined virtual grip position of a virtual grip, and (2) rotating the hand of the user about a rotational angel while holding (by physically touching) the or at least one other of the hardware control switches 30*a*-1, 30*a*-2. Thus, the gesture control mode may therefore be maintained even if the hand of the user is moved further away from the virtual grip position during manipulation of the virtual grip as long as the respective hardware control switch 30a-1, 30a-2 is operated. Instead, when the hardware control switch 30a-1, 30a-2 is released, the gesture control mode may be deactivated. This is advantageous, because it is most natural to hold either the so called trigger or grip button on a controller to activate a gripping action. This is also very reliable as the user can detect when to initiate the action just as they would if it was a real physical object. Further, touching and holding the grip button feels most intuitive in this case.

What is claimed is:

1. A system for processing audio data, comprising:

an audio input unit for receiving input data, the input data being audio data representing a piece of music;

an audio processing unit for processing the input data to obtain output data;

an audio output unit for playing the output data;

a gesture detecting unit for detecting a grip-rotate gesture of a hand of a user;

wherein the grip-rotate gesture comprises a sequence of:

a gripping action, which corresponds to gripping a rod-shaped virtual grip, wherein the virtual grip has a longitudinal axis defining a gripping axis, and a rotating gesture, which corresponds to rotating the virtual grip by a rotational angle about a rotational axis, said rotational axis being substantially orthogonal to the gripping axis;

wherein the audio processing unit is connected to the gesture detecting unit and the audio output unit such as to modify processing of the input data depending on the rotational angle detected by the gesture detecting unit, while continuing playback of the output data; and an artificial reality apparatus adapted to provide visual input for a user to create an artificial reality environment, wherein the artificial reality apparatus is adapted to display the rod-shaped virtual grip at a predetermined virtual grip position in space within an area around the user, wherein the rod-shaped virtual grip has a longitudinal rod portion defining, along its longitudinal axis, the gripping axis of the virtual grip, wherein the longitudinal rod portion is displayed as having dimensions according to at least one of:

a length of the rod portion is between about 0.04 m and about 0.60 m;

a width of the rod portion is smaller than 0.12 m; and a length-to-width ratio of the rod portion is larger than 1.5.

2. The system of claim 1, wherein the audio processing unit is at least one of an equalizer, frequency filter, loop effect unit, a pitch effect unit, an audio effect unit, and a source separation unit decomposing the input data into a plurality of audio data representing different instruments or vocal components included in the input data, wherein at least one operating parameter of the audio processing unit is set depending on the rotational angle detected by the gesture detecting unit.

3. The system of claim 2 wherein the operating parameter is selected from the group consisting of filter frequency, filter gain and filter bandwidth, gain of a frequency or frequency range, a looping parameter, a pitch, an audio effect (FX) parameter, or a volume or other parameter of an instrument or a vocal component.

4. The system of claim 1 wherein the gesture detecting unit is adapted to detect the rotational angle within a predefined angular range between a minimum rotational angle and a maximum rotational angle, and wherein rotational angles within the predefined angular range are mapped to respective operating values of at least one operating parameter of the audio processing unit.

5. The system of claim 4 wherein the size of the angular range is between about 120 degrees and about 240 degrees.

6. The system of claim 4 wherein the size of the angular range is between about 165 degrees and about 195 degrees.

7. The system of claim 1, wherein the gesture detecting unit is adapted to detect whether the grip-rotate gesture is a valid grip-rotate gesture or not, wherein the valid grip-rotate gesture comprises a sequence of:

a valid gripping action which is the gripping action performed while the hand of the user is detected to be within a first tolerance zone around a predetermined virtual grip position which is a predetermined position of the virtual grip within an area around the user; and a valid rotating gesture, which is the rotating gesture while the hand of the user is detected to be within a second tolerance zone around the predetermined virtual grip position; and wherein the audio processing unit is adapted to activate a gesture control mode, in which processing of the input data is modified depending on the rotational angle detected by the gesture detecting unit, only if the grip-rotate gesture is a valid grip-rotate gesture.

8. The system of claim 7, wherein the first tolerance zone is smaller than the second tolerance zone.

9. The system of claim 1, wherein the rod-shaped virtual grip has a longitudinal rod portion defining, along its longitudinal axis, the gripping axis of the virtual grip, wherein the artificial reality apparatus is adapted to display the virtual grip with its gripping axis oriented substantially orthogonally to a radial X direction of the user, wherein the radial X direction is defined as a direction starting from the user and pointing substantially horizontally in a distal direction.

10. The system of claim 1, wherein the virtual grip position is at the same level as or higher than a user's shoulder height.

11. The system of claim 1, wherein the artificial reality apparatus is adapted to display a grip tag in association with the virtual grip, wherein the grip tag shows information regarding a current modification of the processing of the input data depending on the rotational angle.

12. The system of claim 11, wherein the grip tag is displayed by the artificial reality apparatus as a circle or part of a circle around the rotational axis of the virtual grip, wherein the circle or circle part comprises a marked circle segment having an angle along the circle or circle part which is equal to or corresponds to the rotational angle detected by the gesture detecting unit.

13. The system of claim 1, wherein the gesture detecting unit comprises a camera adapted to capture images of the user's hand, and a gesture recognition unit adapted to analyze the images captured by the camera, based on gesture data relating to at least one expected hand gesture.

14. The system of claim 1, wherein the gesture detecting unit comprises a controller which is a wearable or a handheld controller, wherein the controller comprises at least one sensor element for detecting a hand movement and/or at least one control element which can be controlled by the user's hand.

15. The system of claim 1, wherein:

the length of the rod portion is between about 0.06 m and about 0.30 m;

the width of the rod portion is along its entire length and between about 0.02 m and about 0.07 m; and the length-to width-ratio of the rod portion is larger than 3.

16. A method comprising the steps of:

receiving input data which are audio data representing a piece of music;

processing the input data to obtain output data;

playing the output data;

detecting, by using a gesture detecting unit, a grip-rotate gesture of a hand of a user, wherein the grip-rotate gesture comprises a sequence of:

detecting a gripping action, which corresponds to gripping a rod-shaped virtual grip, displaying the rod-shaped virtual grip at a predetermined virtual grip position in space within an area around the user, wherein the rod-shaped virtual grip has a longitudinal rod portion defining, along its longitudinal axis, a gripping axis of the virtual grip, wherein the longitudinal rod portion is displayed as having dimensions according to at least one of:

a length of the rod portion is between about 0.04 m and about 0.60 m;

a width of the rod portion is smaller than 0.12 m; and a length-to-width ratio of the rod portion is larger than 1.5; and a rotating gesture, which corresponds to rotating the virtual grip by a rotational angle about a rotational axis, said rotational axis being substantially orthogonal to the gripping axis; and modifying processing of the input data depending on the rotational angle detected by the gesture detecting unit, while continuing playback of the output data.

17. The method of claim 16, wherein the step of modifying processing of the input data further depends on gesture data prepared by a teaching process, and the teaching process comprises the steps of:

prompting the user to perform a gripping action, which corresponds to gripping a rod-shaped virtual grip, wherein the virtual grip has a longitudinal axis defining a gripping axis; and prompting the user to perform a rotating gesture, which corresponds to rotating the virtual grip by a rotational angle about a rotational axis, said rotational axis being substantially orthogonal to the gripping axis;

observing, by using the gesture detecting unit, a gesture performed by the user in response to the gesture request; and preparing gesture data based on the observed gesture.

18. A non-transitory computer-readable medium embodying program code that, when executed by one or more processors, causes the processors to perform operations comprising:

receiving input data which are audio data representing a piece of music;

processing the input data to obtain output data;

playing the output data;

detecting, by using a gesture detecting unit, a grip-rotate gesture of a hand of a user, wherein the grip-rotate gesture comprises a sequence of:

detecting a gripping action, which corresponds to gripping a rod-shaped virtual grip, displaying the rod-shaped virtual grip at a predetermined virtual grip position in space within an area around the user, wherein the rod-shaped virtual grip has a longitudinal rod portion defining, along its longitudinal axis, a gripping axis; and a rotating gesture, which corresponds to rotating the rod-shaped virtual grip by a rotational angle about a rotational axis, said rotational axis being substantially orthogonal to the gripping axis of the virtual grip, wherein the longitudinal rod portion is displayed as having dimensions according to at least one of:

a length of the rod portion is between about 0.04 m and about 0.60 m;

a width of the rod portion is smaller than 0.12 m; and a length-to-width ratio of the rod portion is larger than 1.5; and modifying processing of the input data depending on the rotational angle detected by the gesture detecting unit, while continuing playback of the output data.

* * * * *